United States Patent
Fujita et al.

(10) Patent No.: US 7,440,010 B2
(45) Date of Patent: Oct. 21, 2008

(54) IMAGE PICKUP DEVICE AND IMAGE PICKUP METHOD

(75) Inventors: Takeo Fujita, Tokyo (JP); Narihiro Matoba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 519 days.

(21) Appl. No.: 10/535,499

(22) PCT Filed: Sep. 30, 2003

(86) PCT No.: PCT/JP03/12553

§ 371 (c)(1),
(2), (4) Date: May 18, 2005

(87) PCT Pub. No.: WO2005/034504

PCT Pub. Date: Apr. 14, 2005

(65) Prior Publication Data

US 2006/0132618 A1   Jun. 22, 2006

(51) Int. Cl.
*H04N 5/228* (2006.01)

(52) U.S. Cl. .............................. 348/222.1; 375/240.12

(58) Field of Classification Search .......... 348/222.1, 348/231, 384, 222, 230, 232, 234, 235, 236, 348/391

See application file for complete search history.

(56) References Cited

U.S. PATENT DOCUMENTS

| | | | | |
|---|---|---|---|---|
| 5,467,129 A | * | 11/1995 | Suzuki | 348/231.6 |
| 5,748,258 A | * | 5/1998 | Tanji | 348/625 |
| 6,430,368 B1 | * | 8/2002 | Hata | 396/79 |
| 7,253,836 B1 | * | 8/2007 | Suzuki et al. | 348/234 |
| 2001/0050875 A1 | | 12/2001 | Kahn et al. | |
| 2004/0091145 A1 | * | 5/2004 | Kohashi et al. | 382/162 |

FOREIGN PATENT DOCUMENTS

| | | |
|---|---|---|
| EP | 0 685 969 A2 | 12/1995 |
| JP | 5-48911 A | 2/1993 |
| JP | 6-54309 A | 2/1994 |
| JP | 6-165027 A | 6/1994 |
| JP | 8-125902 A | 5/1996 |
| JP | 10-108134 A | 4/1998 |
| JP | 11-234669 A | 8/1999 |
| JP | 11-331672 A | 11/1999 |
| JP | 2000-115786 A | 4/2000 |
| JP | 2002-112086 A | 4/2002 |
| JP | 2002-247517 A | 8/2002 |
| JP | 2003-179926 A | 6/2003 |
| JP | 2003-199019 A | 7/2003 |
| WO | WO-03/056818 A1 | 7/2003 |

* cited by examiner

*Primary Examiner*—Lin Ye
*Assistant Examiner*—Amy Hsu
(74) *Attorney, Agent, or Firm*—Birch, Stewart, Kolasch & Birch, LLP (57) ABSTRACT

An image pickup apparatus includes a characteristic value calculation circuit 16 for extracting a characteristic value used for predicting an amount of codes to be generated at a time of compressing a video signal acquired by a solid state image pickup device from the video signal, and a compression coefficient control circuit 17 for controlling a compression coefficient which is used by an image compression unit 18 based on the characteristic value acquired by the characteristic value calculation circuit 16. The compression coefficient control circuit uses the characteristic value acquired by the characteristic value calculation circuit 16 at a time of allowing users to check an image to be picked-up before picking up an image, and determines the compression coefficient at a time of picking up an image.

7 Claims, 5 Drawing Sheets

|  |  | AT TIME OF IMAGE PICKUP ||
|  |  | CCD INTERMITTENT READING MODE | CCD ALL-PIXEL READING MODE |
| --- | --- | --- | --- |
| AT TIME OF CHECKING OF IMAGE OF OBJECT TO BE SHOT | CCD INTERMITTENT READING MODE | 1.00 | 1.30 |
|  | CCD ALL-PIXEL READING MODE | 0.77 | 1.00 |

FIG.5

| RANGE OF FLUCTUATIONS IN CHARACTERISTIC VALUE | ADDITIONAL CORRECTION COEFFICIENT |
| --- | --- |
| 0.00 - 1.00 | 1.00 |
| 1.00 - 2.00 | 1.10 |
| 2.00 - 4.00 | 1.20 |
| 4.00 - 8.00 | 1.35 |
| 8.00 - 16.00 | 1.50 |

FIG.6

IMAGE PICKUP DEVICE AND IMAGE PICKUP METHOD

FIELD OF THE INVENTION

This invention relates to an image pickup apparatus that performs a compression process on images for digital color image pickup equipment, and an image pickup method for use with the image pickup apparatus.

BACKGROUND OF THE INVENTION

Figure 1:
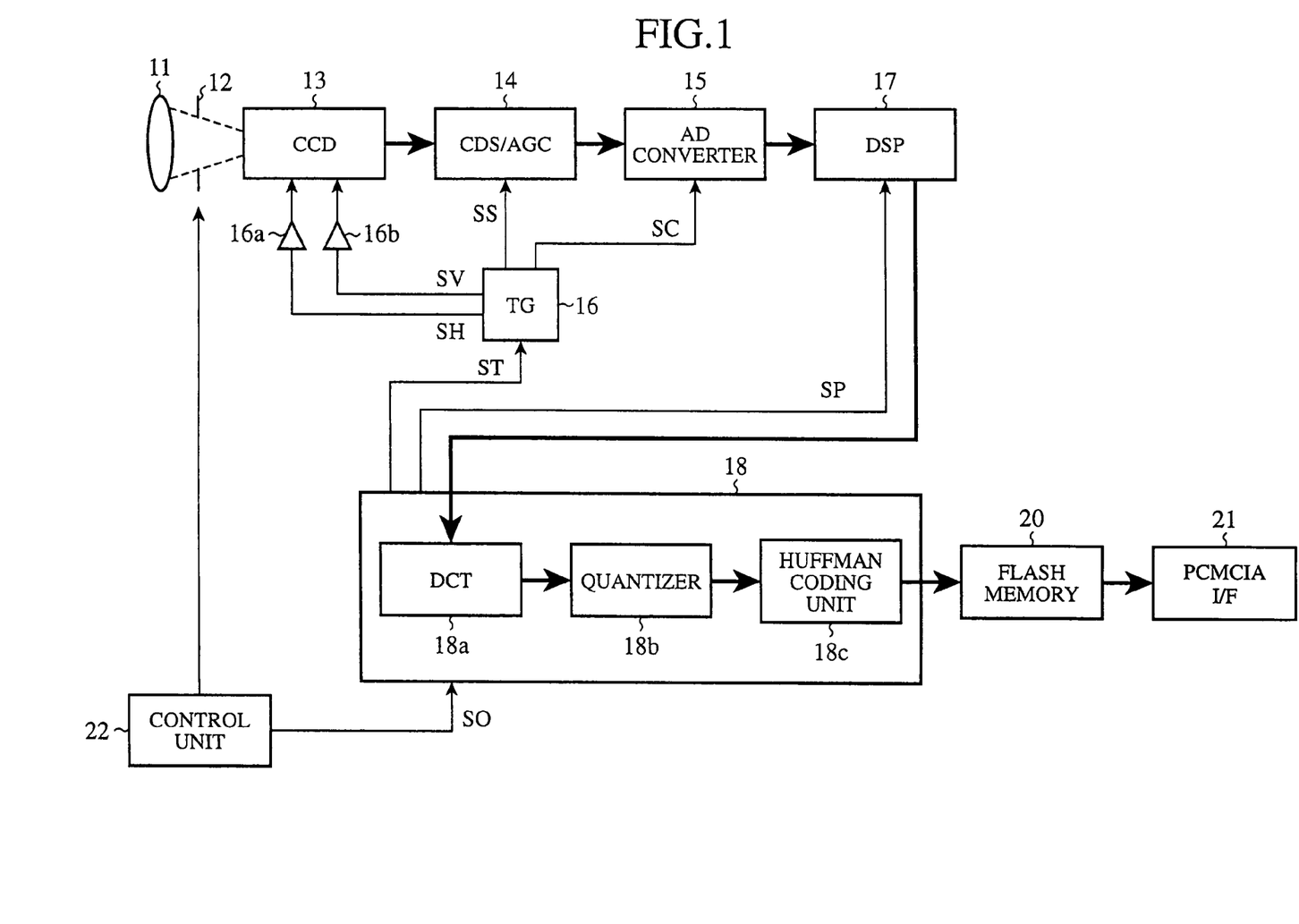
FIG. 1 is a diagram showing the schematic structure of a prior art digital still camera.

FIG. 1 is a diagram schematically showing the structure of a prior art digital still camera as disclosed in Japanese patent application publication (TOKKAIHEI) No. 11-331672, and shows the structure of the prior art digital still camera which does not need any frame memory for storing yet-to-be-compressed image data.

In FIG. 1, reference numeral 11 denotes an image pickup lens, reference numeral 12 denotes a shutter which serves as an aperture, reference numeral 13 denotes a CCD which is a photoelectric transducer, reference numeral 14 denotes an analog signal processing unit (or CDS/AGC), reference numeral 15 denotes an AD converter, reference numeral 16 denotes a timing generator (or TG), reference numeral 17 denotes a digital signal processing unit (DSP), reference numeral 18 denotes an image compression unit (or JPEG encoder), reference numeral 20 denotes a flash memory, reference numeral 21 denotes a memory card interface (or PCMCIA I/F), and reference numeral 22 denotes a control unit.

The image pickup lens 11 forms an optical image of light from an object to be shot on a light receiving surface of the CCD 13. While the aperture-shutter 12 regulates the diameter of a light ray traveling from the image pickup lens 11 to the CCD 13 so as to adjust the amount of light applied to the CCD 13, the aperture-shutter 12 closes so as to restrict the exposure time of the CCD 13 when a predetermined time elapses after the CCD 13 has started photoelectric conversion. The CCD 13 includes a matrix of several 100,000 of sets of three types of pixels that are arranged alternately and respond to red (R) light, green (G) light, and blue (B) light, respectively. The CCD 13 converts received light into a charge and accumulates it for every pixel, and outputs stored charges as analog signals.

The analog signal processing unit 14 carries out a double correlation sampling of the output signals of the CCD 13, and also carries out automatic gain processing. The AD converter 15 converts the analog signals input thereto from the analog signal processing unit 14 into equivalent digital signals, respectively, and outputs them to the digital signal processing unit 17.

The timing generator 16 delivers timing signals SH and SV which indicate the timings of horizontal scanning and vertical scanning, respectively, to the CCD 13 via the buffers 16a and 16b. The timing generator 16 also delivers a timing signal SS which indicates a time to sample the output signals of the CCD 13 to the analog signal processing unit 14, and delivers a timing signal SC which indicates a time to convert the output signals of the analog signal processing unit 14 to the AD converter 15.

The digital signal processing unit 17 performs processes, such as white balance correction, shading, interpolation of signals of three colors: R, G, and B, and gamma control, on the output signals of the CCD 13, which are digitized by the AD converter 15, so as to generate image data comprised of a luminance signal and chrominance signals. A set of image data generated by the digital signal processing unit 17 represents a picked-up image of one frame, and can be displayed just as it is.

The image compression unit 18 compresses the image data generated by the digital signal processing unit 17. The image compression unit 18 comprises a discrete cosine transform unit (DCT) 18a for carrying out a discrete cosine transform of the image data output from the digital signal processing unit 17 for every pixel block of a predetermined size (8×8 pixels), a quantizer 18b for quantizing the transformed image data, and a Huffman coding unit 18c for carrying out Huffman coding of the quantized image data.

The flash memory 20 stores the image data compressed by the image compression unit 18. The card interface 21 copies the image data stored in the flash memory 20 to a detachable/attachable memory card on a frame-by-frame basis. Any other equipment according to the JPEG method can reproduce the picked-up image by reading the copied image data from the memory card, and can perform decoding, inverse quantization, and inverse discrete cosine transform on the copied image data.

The control unit 22 adjusts the brightness of the optical image that is formed on the CCD 13 by adjusting the aperture of the aperture-shutter 12. When a release button provided in a non-illustrated control unit is operated and an instruction for starting to store the image in memory is provided, the control unit 22 provides a control signal SO for instructing a start of operation to the image compression unit 18.

In response to the control signal SO from the control unit, the image compression unit 18 provides a control signal ST to the timing generator 16. In response to this control signal ST, the timing generator 16 outputs timing signals SH, SV, SS, and SC to the CCD 13, the analog signal processing unit 14, and the AD converter 15 so as to cause these units to operate at predetermined intervals, respectively. The predetermined intervals at which each of the timing signals SH, SS, and SC is output are set to one eighth of the time required for the image compression unit 18 to compress image data about eight lines.

After outputting the control signal ST, when the time required for the image compression unit 18 to compress image data about eight lines elapses, the image compression unit 18 provides a control signal SP to the digital signal processing unit 17 and provides the control signal ST to the timing generator 16 again. The control signal SP provided to the digital signal processing unit 17 is the one for requesting output of the generated image data about eight lines. The image compression unit 18 compresses the image data that is output by the digital signal processing unit 17 in response to the control signal SP, and each component stops operating until the next instruction is provided thereto by the control unit 22.

The control unit 22 makes the aperture-shutter 12 closed until it is instructed to store an image by actuation of the release button. When actuation of the release button is made, the control unit 22 makes the aperture-shutter 12 open so that the aperture-shutter 12 has a proper aperture. Then, when the predetermined time that is set to about 1/30 seconds elapses, the control unit 22 makes the aperture-shutter 12 closed again. As a result, the CCD 13 has an exposure time as before, and therefore some problems, such as saturation of the CCD 13, and occurrence of fluctuations in the picked-up image due to movement of the object to be shot or camera movement can be prevented.

A problem with digital still cameras is that digital still cameras need a frame memory for temporarily storing generated image data and cannot perform image data compression processing appropriately unless it has any frame memory. In view of this problem, the above-mentioned conventional digital still camera is so constructed as not to need any frame memory for storing yet-to-be-compressed image data.

A problem with the above-mentioned conventional digital still camera is however that since the above-mentioned conventional digital still camera needs no frame memory by stopping actuation of the CCD intermittently, the time required to pick up an image of one frame becomes long.

Furthermore, in order to improve the ease-of-use of image compression processing, a measure of predetermining the number of compressed images which can be recorded in a recording medium is typically taken. For this reason, a storage capacity assigned to an image of one frame is fixed regardless of the type of the image, and it can be assumed that any image data is compressed data having an amount that is close to a certain amount, but does not exceed the certain amount. Such a method of compressing data is called constant rate control. It is generally necessary to dynamically change parameters for image compression processing, such as the contents of a quantization table for use with quantization processing, and to repeat the compression processing until compressed data having an amount equal to or less than the certain amount, in order to perform constant rate control, because the size of compressed image data changes greatly depending upon characteristics of the image data. However, the above-mentioned conventional digital still camera cannot perform constant rate control because it does not have any means for dynamically changing the parameters for image compression processing.

For example, Japanese patent application publication (TOKKAI) No. 11-234669 discloses a method of extracting a high frequency component contained in a digital signal of an image using a high-frequency component extraction circuit, and controlling compression parameters for use with image compression processing based on extraction results, as a method of performing constant rate control.

However, in most cases, a digital still camera changes its settings, such as the operating state and charge storage time of a CCD thereof, and the amount of light incident upon an aperture, when switching between a mode in which image data is always displayed on a liquid crystal display in order to check an image of an object to be shot, and another mode in which an image of the object to be shot is picked up and recorded in a recording medium in response to actuation of a shutter. This is because two purposes of improving the operability of the digital still camera by reducing the amount of transfer of image data and raising the cycle of updating of images at a time of allowing users to check an image of an object to be shot, and increasing the amount of transfer of image data and recording a fine image at a time of recording images are achieved. Since the size of an image to be shot changes depending upon digital zoom processing at a time of allowing users to check an image of the object to be shot and at a time of picking up an image of the object to be shot, two or more patterns also exist in a switching between operation modes of the CCD. A problem is therefore that when constant rate control is performed in such a switching, it is necessary to control the compression parameter by using a high-frequency component extraction circuit or the like while keeping the settings of the CCD and the aperture and therefore the time required to record a picked-up image in a recording medium after a shutter is actuated becomes long.

Another problem is that since the time required to record a picked-up image in a recording medium after a shutter is actuated becomes long, when picking up an image of an object to be shot in rapid motion, there is a large difference between an image of the object to be shot that is formed onto the CCD when a shutter is actuated and an image actually recorded in a recording medium.

The present invention is made in order to solve the above-mentioned problems, and it is therefore an object of the present invention to provide an image pickup apparatus and an image pickup method that can perform constant rate control without lengthening the time required to record a picked-up image in a recording medium even when changing settings, such as the operating state and charge storage time of a CCD, and the amount of light incident upon an aperture, in order to switch between a mode in which image data is always displayed on a liquid crystal display to allow users to check an image of an object to be shot, and another mode in where an image of an object to be shot is picked up and recorded in a recording medium in response to actuation of a shutter.

DISCLOSURE OF THE INVENTION

In accordance with the present invention, there is provided an image pickup apparatus provided with a characteristic value calculation means for extracting a characteristic value used for predicting an amount of codes to be generated at a time of compressing a video signal acquired by a solid state image pickup device from the video signal; and a compression coefficient control means for controlling a compression coefficient which is used by the data compression means based on the characteristic value acquired by the characteristic value calculation means, the compression coefficient control means using the characteristic value acquired by the characteristic value calculation means at a time of allowing users to check an image to be picked-up before picking up the image, and determining the compression coefficient at a time of picking up an image.

Therefore, the image pickup apparatus can perform compress and record a picked-up image therein immediately after instructed to pick up an image, thereby improving the response of a shutter release button.

PREFERRED EMBODIMENTS OF THE INVENTION

In order to explain the invention in greater detail, the preferred embodiments of the invention will be explained below with reference to the accompanying figures.

Embodiment 1

Figure 2:
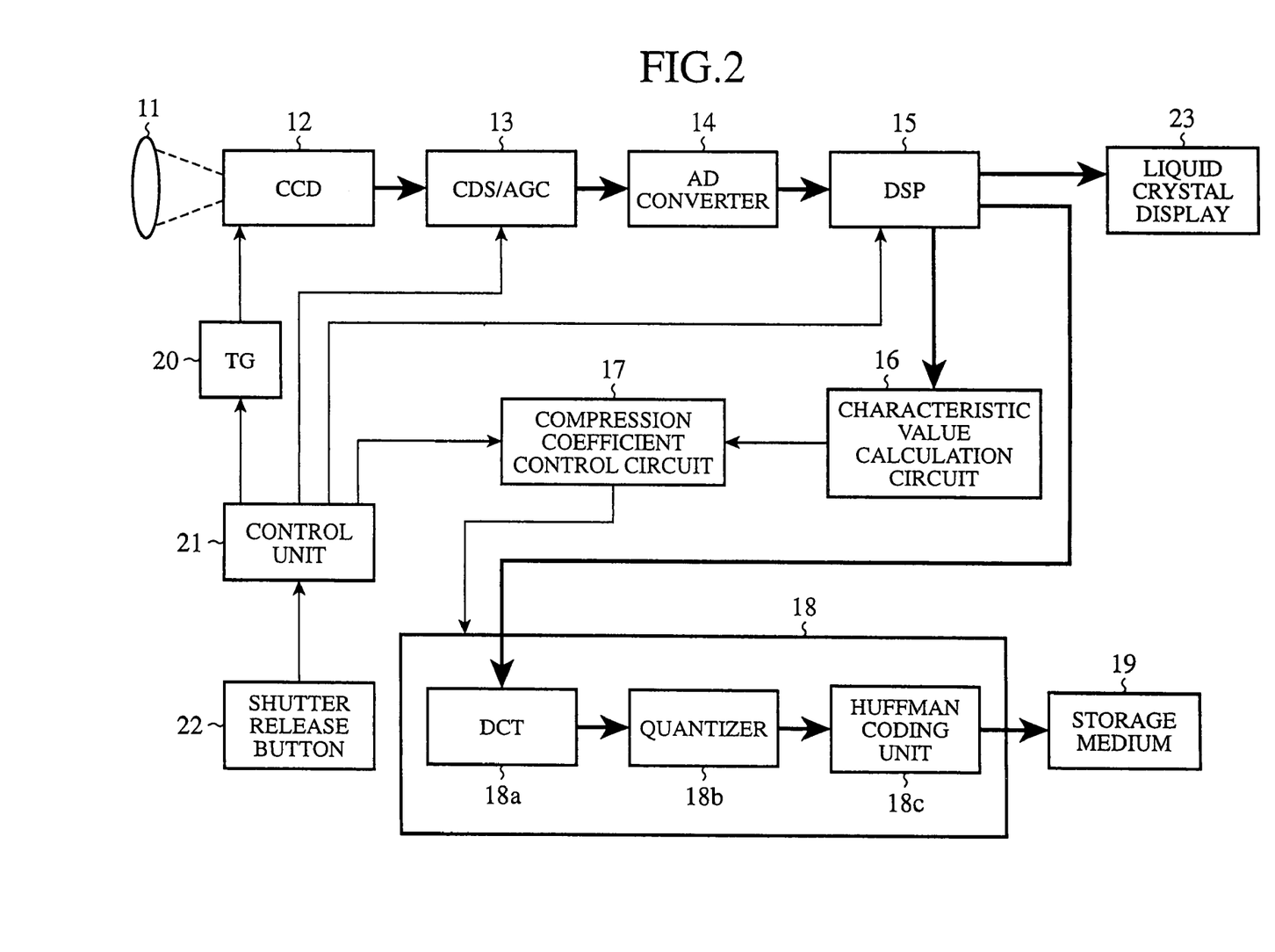
FIG. 2 is a block diagram showing the structure of an image pickup apparatus in accordance with embodiment 1 of the present invention.

FIG. 2 is a block diagram showing the structure of an image pickup apparatus in accordance with embodiment 1 of the present invention.

In the figure, reference numeral 11 denotes an image pickup lens, reference numeral 12 denotes a CCD which is a photoelectric transducer, reference numeral 13 denotes an analog signal processing unit (CDS/AGC), reference numeral 14 denotes an AD converter, reference numeral 15 denotes a digital signal processing unit (DSP), reference numeral 16 denotes a characteristic value calculation circuit for extracting a characteristic value used for predicting the amount of codes to be generated at a time of compressing image data from the image data, reference numeral 17 denotes a compression coefficient control circuit for controlling a compression coefficient which is used by an image compression unit mentioned later based on the characteristic value calculated by the characteristic value calculation circuit 16, reference numeral 18 denotes the image compression unit (i.e., a JPEG encoder), reference numeral 19 denotes a recording medium in which images are recoded, reference numeral 20 denotes a timing generator (TG) for driving the CCD, reference numeral 21 denotes a control unit for controlling the operation of each processing unit, and reference numeral 22 denotes a shutter release button.

Next, the operation of the image pickup apparatus in accordance with embodiment 1 of the present invention will be explained.

The image pickup lens 11 forms an optical image of light from an object to be shot on a light receiving surface of the CCD 12. The CCD 12 is comprised of an array with hundreds of thousands of elements, each element including three pixels that sense red (R) light, green (G) light, and blue (B) light, respectively. The CCD 12 converts light received for every pixel into charge and accumulates the charge, and outputs the accumulated charge as an analog signal.

The CCD 12 has two or more drive modes such as a drive mode in which the CCD sequentially outputs all stored charges, and a drive mode in which the CCD sequentially outputs only stored charges in every other line. The CCD 12 has a function of dynamically switching among the two or more drive modes under control of the timing generator 20.

The analog signal processing unit 13 carries out double correlation sampling of the output signals from the CCD 12, and performs gain control on sampled values. The AD converter 14 converts analog signals input thereto from the analog signal processing unit 13 into equivalent digital signals, and outputs them to the digital signal processing unit 15.

The timing generator 20 provides timing signals indicating timings of horizontal scanning and vertical scanning to the CCD 12. The image pickup apparatus has a function of dynamically switching among the two or more drive modes which the CCD 12 has by controlling a signal output from the timing generator 20.

The digital signal processing unit 15 performs processes, such as white-balance adjustment, correction for defective pixels, interpolation of three color signals, i.e., R, G, and B signals, gamma control, color conversion, etc. on the output signals of the CCD 12, which are digitized by the AD converter 14, so as to generate image data comprised of a luminance signal and color-difference signals.

The image compression unit 18 compresses the image data generated by the digital signal processing unit 17. The image compression unit 18 comprises a discrete cosine transform unit (DCT) 18a for carrying out a discrete cosine transform of the image data output from the digital signal processing unit 17 for every pixel block of a predetermined size (8×8 pixels), a quantizer 18b for quantizing the transformed image data, and a Huffman coding unit 18c for carrying out Huffman coding of the quantized image data.

The image compression unit 18 stores the compressed image data in the storage medium 19. Any other equipment according to the JPEG method can reproduce the picked-up image by reading the copied image data from the recording medium, and performing decoding, inverse quantization, and inverse discrete cosine transform on the copied image data.

The characteristic value calculation circuit 16 calculates a characteristic value used for predicting the amount of codes to be generated at a time of compressing the image data generated by the digital signal processing unit 15 from the image data. The characteristic value calculation circuit 16 extracts a high-frequency component from the image signal and uses, as the characteristic value, a numerical quantity of the high-frequency component contained in the image.

The user operates the shutter release button 22 in order to instruct the image pickup apparatus to pick up an image. When the user operates the shutter release button 22, the shutter release button 22 provides an instruction for recording an image to the control unit 21.

When the shutter release button 22 is pushed, the control unit 21 changes the operation mode of the timing generator 20, the analog signal processing unit 13, and the digital signal processing unit 15 from a mode in which users are allowed to check an image of an object to be shot to another mode in which an image of an object to be shot is picked up. In this switching, both the mode for checking of an image of an object to be shot and the other mode for pickup of an image of an object to be shot differ according to settings, such as the size of the image to be picked-up, a digital zoom magnification setting, etc., which are specified in advance by the user. Therefore, two or more different patterns exist in the switching depending upon a plurality of combinations of settings for both the mode for checking of an image of an object to be shot and the other mode for pickup of an image of an object to be shot. While the control unit 21 notifies that the shutter release button 22 is pushed to the compression coefficient control circuit 17, the control unit 21 also notifies the nature of the switching of the operation mode of the timing generator 20, the analog signal processing unit 13, and the digital signal processing unit 15 to the compression coefficient control circuit 17.

The compression coefficient control circuit 17 controls a compression coefficient which is used by the image compression unit 18 based on the characteristic value calculated by the characteristic value calculation circuit 16. The compression coefficient refers to a parameter (referred to as a Q value from here on) for specifying the accuracy of quantization in the quantizer 18b included in the image compression unit 18. Because the quantization accuracy of the discrete-cosine-transformed data increases when the Q value becomes large, the image quality of the compressed image is improved. Furthermore, since the amount of codes simultaneously generated increases, the size of the generated and compressed image data becomes large.

In contrast, because the quantization accuracy of the discrete-cosine-transformed data decreases when the Q value becomes small, the image quality of the compressed image is degraded. In this case, the amount of codes generated decreases and the size of the generated and compressed image data becomes small. Therefore, when predicting that the size of the generated and compressed image data is large from the characteristic value output from the characteristic value calculation circuit 16, the compression coefficient control circuit 17 controls the image compression unit 18 so that the Q value becomes small to reduce the size of the compressed image data. In contrast, when predicting that the size of the generated and compressed image data is small from the characteristic value output from the characteristic value calculation circuit 16, the compression coefficient control circuit 17 controls the image compression unit 18 so that the Q value becomes large to improve the quality of the compressed image.

The compression coefficient control circuit 17 of embodiment 1 has a mechanism of receiving signals from the control unit 21, and the compression coefficient control circuit 17 operates only when it is notified, via the control unit 21, that the shutter release button 22 is pushed. This is because the image compression unit 18 has to operate only when the shutter release button 22 is pushed and the image compression unit 18 stores the compressed image data in the storage medium 19. At this time, the compression coefficient control circuit 17 receives information indicating how the operation mode of the timing generator 20, the analog signal processing unit 13, and the digital signal processing unit 15 is changed from the control unit 22, and changes a method of controlling the Q value from the characteristic value output by the characteristic value calculation circuit 16 based on the information.

The liquid crystal display 23 can display the object to be shot at the time of allowing the user to check an image of an object to be shot before the image pickup apparatus is instructed to pick up an image by the user whenever necessary. At the time of allowing the user to check an image of an object to be shot, the control unit controls the timing generator 20 so as to intermittently read stored charges from the CCD 12, and raises a rate of updating frames by reducing the time required for reading one frame of the image, thereby improving the operability of the image pickup apparatus when the user adjusts the angle of view of the image of the object to be shot. Since the size of the output image and the order of pixel data need to be changed according to the drive mode of the CCD 12, the operation mode of the analog signal processing unit 13 and the digital signal processing unit 15 needs to be established according to the drive mode of the CCD 12. Since it is not necessary to compress and record generated image data at the time of allowing the user to check an image of an object to be shot, the image data on which image processing is performed by the digital signal processing unit 15 is sent to the liquid crystal display 23 just as it is, without being passed through the compression processing unit 18, and is displayed, as an image, so that the user can check an image of an object to be shot.

Next, a detailed description will be made as to the operation of the compression coefficient control circuit 17 in the case where the operation mode is switched from the mode for checking of an image of an object to be shot to the other mode for pickup of an image of an object to be shot in response to actuation of the shutter release button 22.

Figure 3:
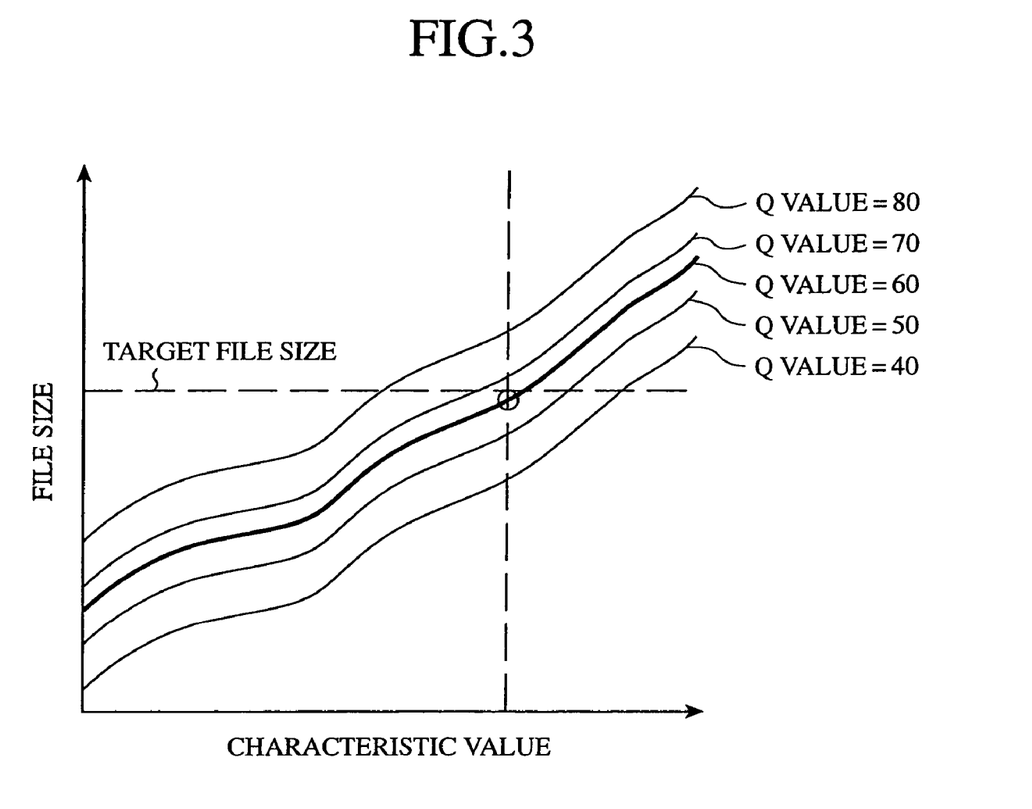
FIG. 3 is an explanatory drawing showing a relationship between characteristic values and file sizes.

FIG. 3 is an explanatory drawing showing a relationship between characteristic values and file sizes of the image data. This diagram shows a graph of a relationship between the characteristic value output from the characteristic value calculation circuit 16 and the file size of the compressed image data. The compression coefficient control circuit 17 holds, as data, information corresponding to the graph and indicating a correspondence between the characteristic value and the file size of the compressed image data. It is necessary to measure those data in advance from compressed results generated at a time of actually picking up images. In the graph of FIG. 3, each polygonal line shows a relationship between the characteristic value and the file size of compressed image data for a certain Q value. Since the file size of compressed image data becomes large with respect to the same characteristic value as the Q value increases, the corresponding polygonal line shifts upward. In contrast, since the file size of compressed image data becomes small with respect to the same characteristic value as the Q value decreases, the corresponding polygonal line shifts downward.

Next, a method of determining the Q value using the graph of FIG. 3 which the compression coefficient control circuit 17 employs will be explained. Since the characteristic value calculation circuit 16 calculates a characteristic value corresponding to an image currently being shot, the compression coefficient control circuit 17 acquires an intersection of the calculated characteristic value and a target file size determined in advance. A polygonal line which is located below the intersection of the target file size and the calculated characteristic value and most upwardly represents the largest Q value which can be used as long as the actual file size of the compressed image data does not exceed the target file size. Therefore, what the image pickup apparatus has to do is just to control the image compression unit 18 with reference to the Q value corresponding to that polygonal line.

The above-mentioned method is directed to the case where there is no modification of the settings of the system when the image pickup apparatus picks up an image of an object to be shot. Since the settings of the system are actually changed at the time of picking up an image of an object to be shot, there is a possibility that the file size of the compressed image data corresponding to the Q value determined based on the characteristic value greatly deviates from the target file size.

Figure 4:
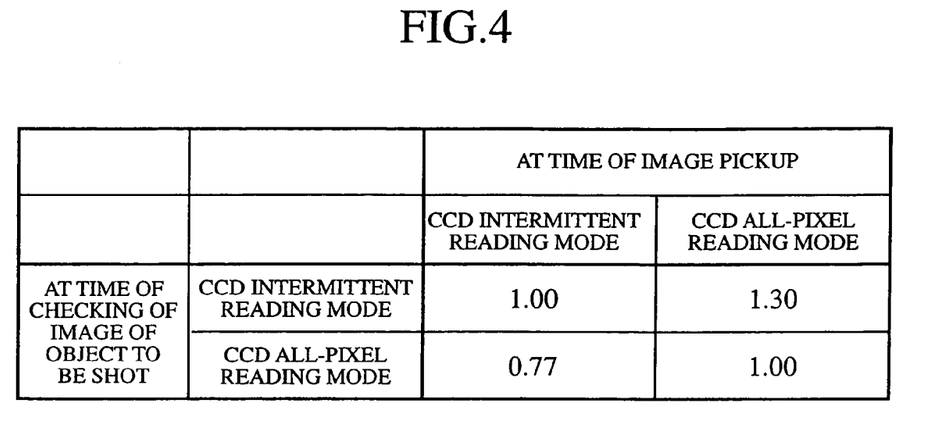
FIG. 4 is an explanatory drawing showing a characteristic value correction coefficient table.

FIG. 4 is an explanatory drawing showing a characteristic value correction coefficient table. What is illustrated in FIG. 4 is an example of the characteristic value correction coefficient table which is used in order to prevent such a deviation of the actual file size from the target file size. For example, when the CCD drive mode is switched from the intermittently reading mode to the all-pixels reading mode in order to pick up an image, the compression coefficient control circuit refers to a specific element of the table, i.e., a specific coefficient, the element being specified by the CCD intermittently reading mode, which is set at a time of allowing users to check an image of the object to be shot, and the CCD all-pixels reading mode, which is set as the time of picking up an image of the object to be shot, and multiplies the calculated characteristic value by the coefficient acquired as a correction coefficient. Thereby, the compression coefficient control circuit can correct an error included in the characteristic value, which is caused by the modification of the settings of the system, and can calculate a proper Q value from the target file size.

Coefficients included in this characteristic value correction coefficient table need to be calculated in advance based on results of measurement of a change in the characteristic value at a time of actually changing the CCD operation mode and picking up an image of the object to be shot.

Although there are some patterns in the change of the CCD operation mode that differ according to the image size and the digital zoom magnification setting, etc. which are specified by the user, a proper correction coefficient can be selected regardless of the change by preparing a table, as shown in FIG. 4, including all possible combinations of one out of all the operation modes at the time of allowing users to check an image of the object to be shot, and one out of all the operation modes at the time of picking up an image of the object to be shot.

As mentioned above, in accordance with embodiment 1, since the image pickup apparatus appropriately determines a compression parameter at a time of picking up an image of an object to be shot by using characteristic value information which is acquired before starting the image pickup process, the image pickup apparatus can perform compression and recording of acquired image data immediately after it is instructed to pick up an image, thereby improving the response of the shutter release button.

Since the image pickup apparatus need not have any frame buffer for temporarily recording a not-yet-compressed image, the cost of the image pickup apparatus can be reduced.

In addition, since the image pickup apparatus calculates a characteristic value, makes a correction to the characteristic value, and then determines a coefficient at the time of compressing the image data using the corrected characteristic value, the image pickup apparatus can implement rate control with little error for a target file size even when changing from an operation mode of the CCD 12 to another operation mode of the CCD 12 in order to switch between a time of image pickup operation and a time of image checking operation.

Furthermore, the image pickup apparatus makes a correction to a change in the operation settings of the image pickup apparatus by using a table at a time of image pickup operation. Therefore, even when there exist many patterns in the switching depending upon a plurality of combinations of settings for both the operation mode for checking of an object to be shot and the other operation mode for pickup of an image of the object to be shot, the image pickup apparatus can implement rate control with little error for any of all the patterns.

In addition, since the image compression unit 18 is so constructed as to operate only when the shutter release button 22 is pushed and an image pickup operation is performed, the power consumption of the system can be reduced and therefore the battery operation time can be lengthened.

Embodiment 2

The image pickup apparatus in accordance with above-mentioned embodiment 1 uses a single characteristic value, and the compression coefficient control circuit controls the Q value of the image compression unit based on the characteristic value. An image pickup apparatus without any frame buffer may restrict a transfer rate at which image data are transferred by way of components arranged at the back of an image compression unit to a lower value as compared with a transfer rate at which image data are transferred by way of components arranged at the front of the image compression unit. This is because it can be expected that the image compression reduces the amount of data, and the restriction is made in order to reduce the cost of the whole of the apparatus while a necessary minimum transfer rate is ensured for transfer of compressed image data. In such image pickup apparatus, there is a possibility that even though the amount of compressed data about the whole of an image is so controlled as to agree with a target amount of data, if the compressed data size becomes large locally, the amount of transfer of data goes beyond a transfer capability and a phenomenon in which image compression processing cannot be performed normally occurs.

In accordance with embodiment 2, an image pickup apparatus without any frame buffer uses two types of characteristic values so as to perform proper image compression processing, as will be explained below.

The image pickup apparatus in accordance with embodiment 2 is constructed in the same way as that in accordance with embodiment 1 shown in FIG. 2. Therefore, the explanation of the structure of the image pickup apparatus in accordance with embodiment 2 will be omitted hereafter.

Next, the operation of the image pickup apparatus in accordance with embodiment 2 of the present invention will be explained.

The image pickup apparatus in accordance with embodiment 2 operates in much the same manner as that in accordance with embodiment 1, and therefore the same operation of the image pickup apparatus as that in accordance with embodiment 1 will be omitted hereafter and only a specific operation of the image pickup apparatus in accordance with embodiment 2 will be explained. The image pickup apparatus in accordance with embodiment 2 differs from that in accordance with above-mentioned embodiment 1 in that each of a characteristic value calculation circuit 16 and a compression coefficient control circuit 17 shown in FIG. 2 operate in a manner different from that stated in embodiment 1.

The operations of the characteristic value calculation circuit 16 and compression coefficient control circuit 17 of the image pickup apparatus in accordance with embodiment 2 will be explained in detail.

While the characteristic value calculation circuit 16 calculates a characteristic value corresponding to the whole of an input image, like that in accordance with embodiment 1, the characteristic value calculation circuit 16 divides the entire image into two or more areas and calculates a characteristic value for each of the two or more areas. The characteristic value calculation circuit 16 selects the largest one of characteristic values calculated for all the divided two or more areas as a maximum characteristic value at a time of area division, and outputs the largest characteristic value to the compression coefficient control circuit 17 as well as the characteristic value calculated for the whole of the image.

In addition to predetermining a target file size, like that of embodiment 1, the compression coefficient control circuit 17 determines a compression size limit based on a rate of transfer of image data through components at the back of the image compression unit 18.

As long as the compression size limit is so determined that a ratio of image sizes before and after compressed agrees with a ratio of a rate of transfer of image data through components at the front of the image compression unit 18 and the rate of transfer of image data through components at the back of the image compression unit 18, the amount of data transfer does not go beyond transfer capability locally.

The compression coefficient control circuit 17 calculates proper Q values for controlling the image compression unit 18 with reference to a relationship between the characteristic value and the target file size, as shown in FIG. 3, and a characteristic value correction coefficient table as shown in FIG. 4, like that of embodiment 1. At that time, the compression coefficient control circuit 17 calculates two Q values: the one which is based on a combination of the characteristic value of the whole of the image and the target file size, and the one which is based on a combination of the maximum characteristic value at the time of area division and the compression size limit.

The compression coefficient control circuit 17 makes it possible for the image compression unit 18 to compress the input image without the file size exceeding the target file size and so that no local overtransfer of data occurs, by controlling the image compression unit 18 using a smaller one of those two calculated Q values.

As mentioned above, in accordance with embodiment 2, since the image pickup apparatus is so constructed as to control a Q value by taking an increase in the local file size due to a change in the data transfer rate into consideration in addition to the target file size, even if the transfer rate of output data on which image compression is performed is restricted, the image pickup apparatus can control the file size of compressed data most properly in consideration of the restriction on the transfer rate.

Embodiment 3

The image pickup apparatus in accordance with above-mentioned embodiment 2 uses only a characteristic value calculated for the last frame in order to predict the amount of codes to be generated at the time of data compression. In this case, when the CCD drive mode at the time of allowing users to check an image of an object to be shot is set to an intermittent reading mode, and at the time of pickup of an image of an object to be shot the CCD drive mode is switched from the intermittent reading mode to all-pixel reading mode. There are cases where correction errors remain even if a correction is made by using the characteristic value correction coefficient table as shown in FIG. 4 because intermittent reading of image data causes a loss of a part of information from the image data at the time of allowing users to check an image of an object to be shot.

In accordance with embodiment 3, an image pickup apparatus reduces correction errors based on a change in a characteristic value with respect to time, as will be explained below.

The image pickup apparatus in accordance with embodiment 3 is constructed in the same way as that in accordance with embodiment 1 shown in FIG. 2. Therefore, the explanation of the structure of the image pickup apparatus in accordance with embodiment 3 will be omitted hereafter.

Next, the operation of the image pickup apparatus in accordance with embodiment 3 of the present invention will be explained.

The image pickup apparatus in accordance with embodiment 3 operates in much the same manner as that in accordance with embodiment 1, and therefore the same operation of the image pickup apparatus as that in accordance with embodiment 1 will be omitted hereafter and only a specific operation of the image pickup apparatus in accordance with embodiment 3 will be explained. The image pickup apparatus in accordance with embodiment 3 differs from that of embodiment 1 in that a characteristic value calculation circuit 16 shown in FIG. 2 operates in a manner different from that stated in embodiment 1.

The characteristic value calculation circuit 16 in accordance with embodiment 3 calculates a characteristic value used for predicting the amount of codes to be generated at the time of compressing image data generated by the digital signal processing unit 15 based on the image data, like that of embodiment 1. The characteristic value calculation circuit 16 stores characteristic values respectively calculated for the latest several frames.

For example, in a case where the characteristic value calculation circuit 16 extracts a high-frequency component, as a characteristic value, from the input image, while in the all-pixel reading mode it is possible to recognize that an error occurs between the characteristic value at the time when the CCD 12 is placed in the intermittent reading drive mode, the characteristic value being corrected by using a correction coefficient, and the characteristic value at the time when the CCD 12 is placed in the all-pixel reading drive mode, in the intermittent reading mode the input image includes many specific high-frequency components which can disappear. In this case, since the pixel values of the input image at the intermittent reading mode are greatly changed because of a phase relationship between a spacing between two adjacent image sensor elements arranged on the image pickup surface of the CCD 12 and the high-frequency component of the image, it can be expected that the characteristic value itself changes greatly with respect to time.

Figure 5:
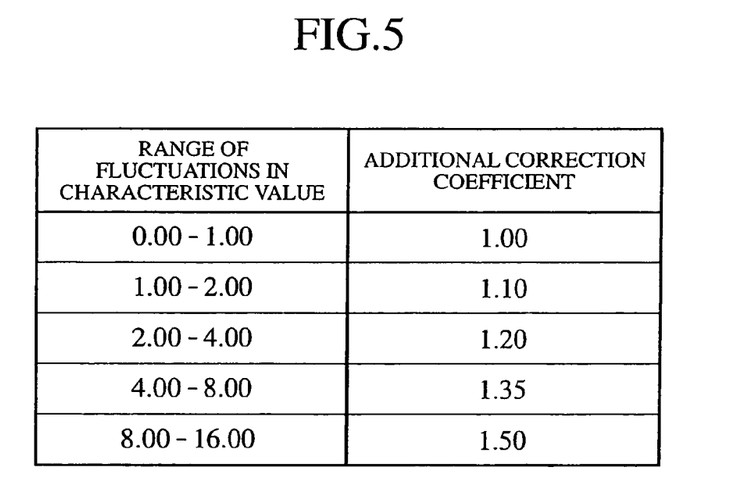
FIG. 5 is an explanatory drawing showing a relationship between ranges of fluctuations in a characteristic value and additional correction coefficients.

FIG. 5 is an explanatory drawing showing a relationship between ranges of fluctuations in the characteristic value and additional correction coefficients. The characteristic value calculation circuit 16 acquires a range of fluctuations between a maximum of the characteristic value and a minimum value of the characteristic value from a history of characteristic values respectively stored for several frames. A large range of fluctuations shows that the input image has many high-frequency components and there is a high possibility that the characteristic value obtained in the all-pixel reading mode becomes larger than the characteristic value corrected by using a correction coefficient. Therefore, a table showing a relationship between a range of fluctuations in the characteristic value and an additional correction coefficient is created in advance, as shown in FIG. 5, and the characteristic value calculation circuit 16 additionally multiplies the characteristic value, which has been multiplied by the correction coefficient, by an additional correction coefficient corresponding to the acquired range of fluctuations in the characteristic value.

As mentioned above, in accordance with embodiment 3, since the image pickup apparatus makes an additional correction to the calculated characteristic value based on fluctuations in the characteristic value with respect to time, the image pickup apparatus can control the file size of the compressed image data with a higher degree of accuracy.

Embodiment 4

The image pickup apparatus in accordance with any one of the above-mentioned embodiments needs to pre-measure data indicating a relationship between a characteristic value showing a predicted amount of compressed and coded image data, which is used by the compression coefficient control circuit 17, and a file size, and data indicating a correction coefficient table, and needs to store them, as fixed data, in the image pickup circuitry. However, since the above-mentioned various data are greatly affected by the performance of the optical system and the characteristics of the whole of the image pickup apparatus, such as the sensibility characteristics of the CCD 12, under actual operating conditions, it is difficult to determine the fixed data during the design phase of the image pickup circuitry. On the other hand, if those data are perfectly fixed, the image pickup apparatus cannot respond flexibly to any change in the characteristics of the whole of the image pickup apparatus, such as a modification made to the optical system.

In order to work around such a problem, an image pickup apparatus in accordance with this embodiment 4 is so constructed as to rewrite data, which a compression coefficient control circuit 17 uses in order to control a compression coefficient, based on data received thereby by using a communications means.

Figure 6:
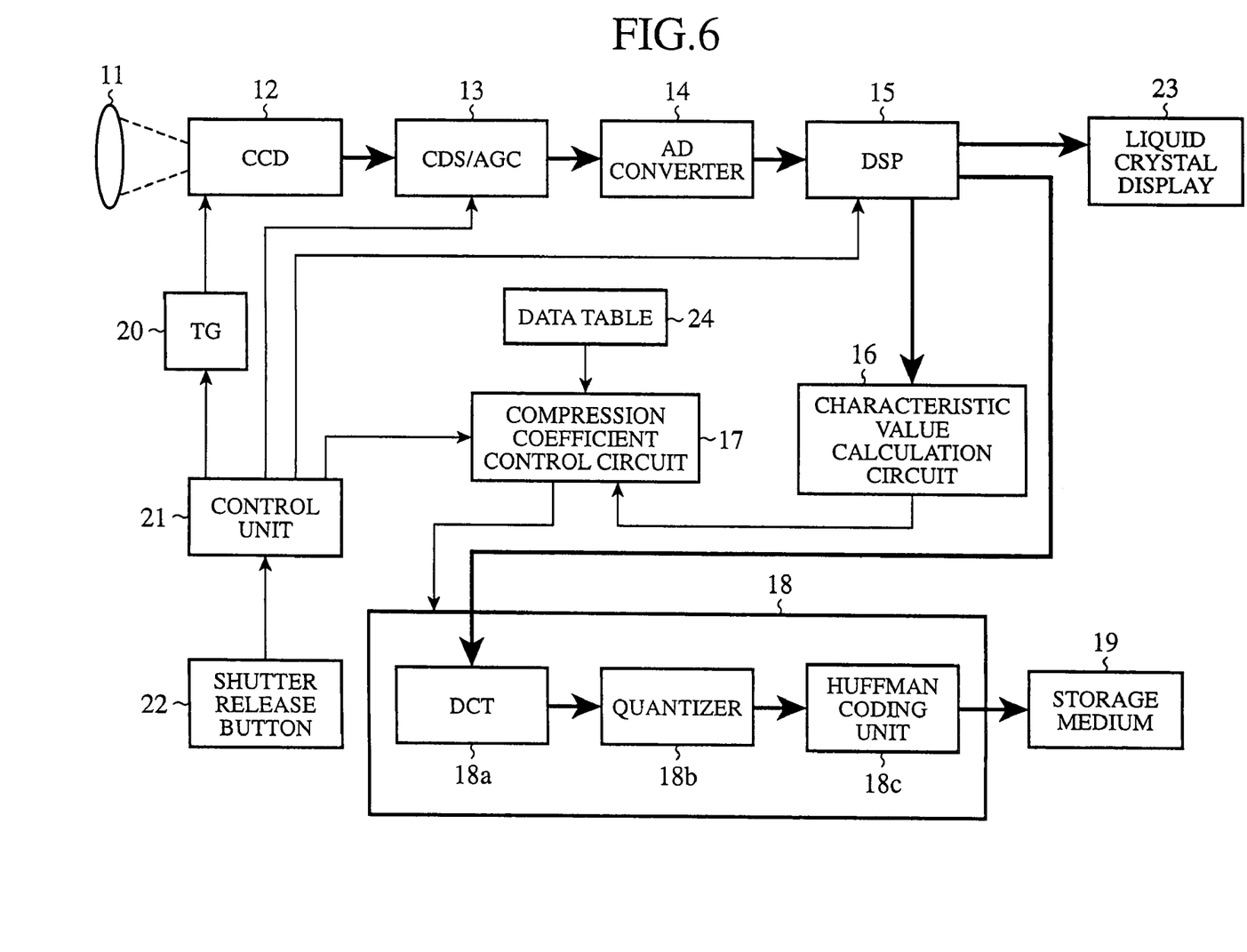
FIG. 6 is a block diagram showing the structure of an image pickup apparatus in accordance with embodiment 4 of the present invention.

FIG. 6 is a block diagram showing the structure of an image pickup apparatus in accordance with embodiment 4 of the present invention. The same components as shown in FIG. 2 or like components are designated by the same reference numerals as shown in FIG. 2, and the explanation of those components will be omitted hereafter. Reference numeral 24 denotes a data table for storing both data indicating a relationship between a characteristic value, which the compression coefficient control circuit 17 uses for prediction of the amount of compressed codes, and a file size, and data about a correction coefficient table.

This data table 24 has a function of communicating with external equipment, and can freely rewrite each of the above-mentioned data that is held in a memory mentioned below and owned by the data table 24 itself, by using a serial communications function, for example.

The data table 24 is provided with a nonvolatile memory capable of holding data being temporarily stored therein even when the settings of the whole of the image pickup apparatus are reset or when the image pickup apparatus is turned on again after turned off.

Next, the operation of the image pickup apparatus in accordance with embodiment 4 of the present invention will be explained.

The image pickup apparatus in accordance with embodiment 4 is provided with the data table 24 in addition to the structure of the image pickup apparatus in accordance with embodiment 1, and the image pickup apparatus in accordance with embodiment 4 operates in the same manner as that of embodiment 1 with the exception that the data table 24 can freely rewrite each data stored therein with data transmitted thereto from outside the image pickup apparatus. As mentioned above, the data table 24 is provided with a communications means for carrying out serial communications with external equipment, and the nonvolatile memory for storing and holding various data. The data table 24 stores both data indicating a relationship between a characteristic value, which the compression coefficient control circuit 17 uses for prediction of the amount of compressed codes, and a file size, data about a correction coefficient table, and so on in the nonvolatile memory. When the image pickup apparatus is instructed to change data stored in the data table 24 by external equipment and receives data to be newly stored from the external equipment, the data table 24 rewrites corresponding data stored therein with the new data from the external equipment. The other operations of the image pickup apparatus in accordance with embodiment 4 are the same as those of the image pickup apparatus in accordance with above-mentioned embodiment 1, and the explanation of the other operations of the image pickup apparatus will be omitted hereafter.

As mentioned above, in accordance with embodiment 4, the image pickup apparatus can freely rewrite each of various data which the compression coefficient control circuit 17 uses by using communications with external equipment. Even if the characteristics of the lens 11 or the sensibility characteristics of the CCD 12 are changed, the image pickup apparatus can change each of the various data used for control of compression coefficients, and therefore can flexibly support a modification of the structure of the lens 11 or the CCD 12.

INDUSTRIAL APPLICABILITY

As mentioned above, the image pickup apparatus and the image pickup method in accordance with the present invention are suitable for implementation of image pickup equipment that performs compression and recording processes on an image with a quick response to actuation of the shutter release button, immediately after instructed to pick up the image.

The invention claimed is:

1. An image pickup apparatus provided with a solid state image pickup device and a data compression means for compressing a video signal acquired by said solid state image pickup device, characterized in that said image pickup apparatus comprises:
a characteristic value calculation means for extracting a characteristic value used for predicting an amount of codes to be generated at a time of compressing a video signal acquired by said solid state image pickup device from the video signal; and
a compression coefficient control means for controlling a compression coefficient which is used by said data compression means based on the characteristic value acquired by said characteristic value calculation means, said compression coefficient control means using the characteristic value acquired by said characteristic value calculation means at a time of allowing users to check an image to be picked-up before picking up the image, and determining the compression coefficient at a time of picking up an image,
wherein the compression coefficient control means is arranged to correct an error included in the characteristic value caused by a change in operation mode in the image pickup apparatus from a mode in which a user is allowed to check an image to be picked-up to another mode in which an image is picked up by use of a correction coefficient calculated in advance based on a result of measurement of a change in characteristic value at a time of change of an operation mode.

2. The image pickup apparatus according to claim 1, characterized in that said characteristic value calculation means divides the picked-up image into two or more areas, calculates a characteristic value for each of the two or more areas in addition to the characteristic value acquired from the whole of the picked-up image, and outputs the largest one of the characteristic values acquired for the two or more areas, as a local maximum characteristic value, and said compression coefficient control means controls the compression coefficient which is used by said data compression means based on the two characteristic values acquired by said characteristic value calculation means.

3. The image pickup apparatus according to claim 1, characterized in that said characteristic value calculation means stores characteristic values acquired for two or more frames, and makes a correction to a characteristic value which said characteristic value calculation means will output according to a change in the characteristic values acquired for the two or more frames.

4. The image pickup apparatus according to claim 1, characterized in that said compression coefficient control means rewrites information about on a list of data or coefficients using data transmitted thereto by using communications with external equipment.

5. An image pickup method of picking up an image using a solid state image pickup device, and performing image compression processing on the picked-up image, and recording the compressed image in a recording medium, characterized in that said method comprising:
a characteristic value calculation step for extracting a characteristic value used for predicting an amount of codes to be generated at a time of compressing a video signal acquired by said solid state image pickup device from the video signal;
a compression coefficient control step for controlling a compression coefficient which is used for data compression based on the characteristic value acquired in said characteristic value calculation step; and
a data compression step for compressing the video signal acquired by said solid state image pickup device using the compression coefficient acquired in said compression coefficient control step, said compression coefficient control step including steps of using the characteristic value acquired by said characteristic value calculation means at a time of allowing users to check an image to be picked-up before picking up the image, and determining the compression coefficient at a time of picking up an image, and said characteristic value calculation step comprises an error correction step, the error being included in the characteristic value and being caused by a change in operation mode from a mode in which a user is allowed to check an image to be picked-up to a mode in which the image is picked up, the error correction step including:

referring to a characteristic value correction coefficient calculated in advance based on a result of measurement of a change in characteristic value at a time of change of an operation mode.

6. The image pickup apparatus according to claim 1, comprising a characteristic value correction table containing correction coefficients calculated in advance based on results of a measurement of a change in characteristic value at a time of change of an operation mode, the characteristic value correction coefficient table including all possible combinations of one out of all the operation modes at the time of allowing a user to check an image to be picked-up, and one out of all the operation modes at the time of picking up of the image.

7. The image pickup apparatus according to claim 6, wherein the compression coefficient control means is arranged to refer to a specific correction coefficient of the characteristic value correction coefficient table according to the specific change in operation mode and to multiply the characteristic value by the specific correction coefficient.

* * * * *